Nov. 10, 1970     W. H. EDMUNDS     3,539,867

GROUND-FAULT PROTECTION SYSTEMS

Filed Aug. 26, 1968

INVENTOR.
WILLIAM HAROLD EDMUNDS
BY
ATTORNEY

United States Patent Office 3,539,867
Patented Nov. 10, 1970

3,539,867
GROUND-FAULT PROTECTION SYSTEMS
William Harold Edmunds, Valley Forge, Pa., assignor to Federal Pacific Electric Company, Newark, N.J., a corporation of Delaware
Filed Aug. 26, 1968, Ser. No. 755,228
Int. Cl. H02h 3/16; H01h 47/00
U.S. Cl. 317—18                                    5 Claims

ABSTRACT OF THE DISCLOSURE

The present invention relates to a ground-leakage protector including a ground-fault release coil controlled by a ground-fault detector. The ground-fault release coil is normally energized, and is de-energized when a ground fault appears which disables a restraining latch which results in the opening of the circuit breaker.

---

The present invention relates to electric circuits having provision for ground-fault protection. The term "ground-fault" is used here to signify any level of current-to-ground that is considered hazardous in any given situation, whether it be low-current leakage, or an arcing fault or short-circuit to ground.

For many years a great deal of attention has been focused on arrangements for providing protection against the hazards of ground leakage and other ground-faults in electric distribution circuits, and in loads connected to such circuits. A prominent example of such protection that has attracted attention in recent years is the protection provided for a power line extending from a service entrance panel to various electrical loads of a swimming pool such as underwater lights, a circulating pump, etc. Another example is a typical electrical outlet to which there is connected a portable tool, often including an extension cable. Still further it has been proposed that at least certain parts of the wiring of a typical home or an office building or any other type of building having one or more branch electric circuits should be equipped with ground-fault protection means. Where there is danger to human lives due to ground-faults, the protection against such faults should meet high standards of dependability.

An object of the present invention resides in providing electrical distribution circuits with automatic ground-fault protection means having fail-safe features.

A further object of the invention resides in providing electrical circuit protection wherein a circuit breaker equipped with overcurrent release means is also responsive to ground-faults, improved to provide fail-safe features.

In the illustrative embodiments of the invention below, a circuit breaker in the protected circuit includes a ground-fault release coil controlled by a ground-fault detector. The ground-fault release coil is normally energized, and is de-energized when a ground-fault appears. De-energization of the release coil disables a restraining latch, with the result that the circuit-breaker contact-opening mechanism becomes effective to interrupt the circuit. Because the coil must be energized continuously in order to keep the circuit breaker closed, it will be convenient to refer to the coil as "holding coil." The circuit breaker with its ground-fault release coil is also equipped with overcurrent sensing means for automatically opening the contacts in case of an overload or short-circuit. In accordance with a particularly advantageous feature of the invention, the holding coil is arranged to cooperate with the overcurrent sensing structure so as to release the same latching means as is provided for overload release. The invention is particularly concerned with providing protection against low current leakage paths to ground. Such leakage paths could represent an indication of imminent severe ground-faults about to occur, and such leakage currents often represent a hazard to lives.

The use of ground-fault protection equipment in which a tripping coil controls a circuit breaker is well known. The ground-fault detector in such systems commonly provides an energizing signal for a tripping coil that causes opening of the main current supply contacts. Such systems have a very serious defect that has been overlooked heretofore, namely, in the event that the coil is burned out or in the event that electrical connections between the detection circuit and the release coil are undependable or interrupted, then the occurrence of a fault would not result in opening of the contacts. Pursuant to an important feature of the present invention the coil that responds to the ground-fault detector in a system of the type here involved would become de-energized in case it is burned out or in case the circuit connections to the coil should become even momentarily interrupted. As a result, the release mechanism of the protective contacts becomes operative immediately to open the circuit.

A further object of the invention resides in providing means for reclosing the foregoing type of circuit interrupters automatically in the event of a momentary or sustained interruption of power, which does not operate to restore the circuit where the opening of the circuit interrupter resulted from a ground-fault or an overload. This feature of the invention guards against so-called nuisance tripping. If the supply voltage should disappear momentarily or if the voltage should drop to such a low level that the holding coil releases the circuit breaker, then there would be an unwanted opening of the contacts. The opening in that case would not be due to either a ground-fault or to an over-current; and yet because of the fail-safe characteristic of the holding-coil circuit, the protective contacts would open. A feature of the invention resides in providing automatic contact reclosing means effective upon interruption of the supply power and consequent release of the protective contacts, to reclose the circuit breaker automatically when the power is restored.

The nature of the invention including the foregoing and other objects and novel features and advantages will be more fully appreciated from the following detailed description of the illustrative embodiments of the invention in its various aspects. These embodiments are shown in the accompanying drawings wherein.

Figure 1:
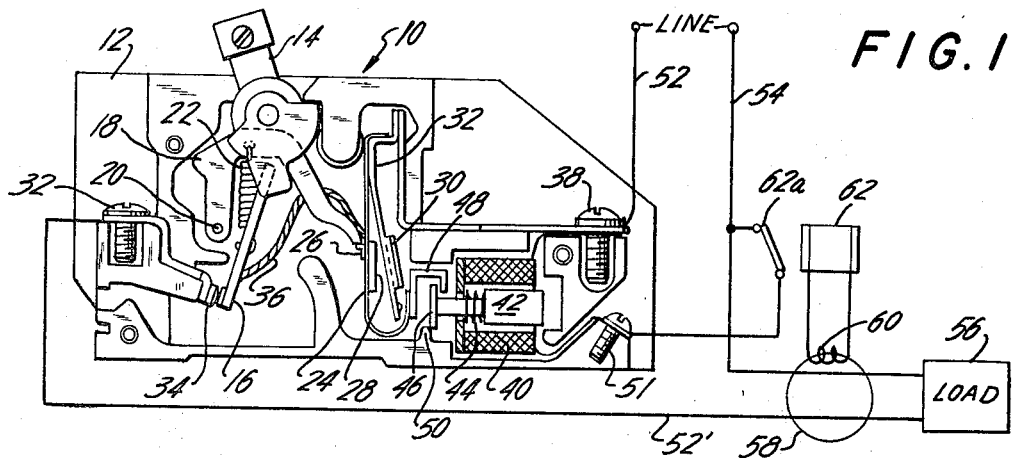
FIG. 1 is a wiring diagram of a ground-fault protection system, including a circuit breaker forming part of that system, the circuit breaker having its side cover removed to reveal the internal mechanism.

Referring now to FIG. 1, a circuit breaker 10 is shown in somewhat simplified form, representing a well-known type of circuit breaker mechanism modified for purposes of the present invention. The basic form of circuit breaker is shown in greater detail in U.S. Patent No. 2,692,926 issued Oct. 26, 1954 to L. W. Cole. This circuit breaker includes a molded case 12 whose front cover is removed to show the internal mechanism. The circuit breaker includes a pivoted manual operating handle 14 having a recess or socket providing a pivot for the upper end of movable contact arm 16. A cradle 18 having a pivot 20 in case 12 is biased clockwise about its pivot by tension spring 22. The ends of the spring are connected to cradle 18 and contact arm 16, respectively. At the right-hand extremity of cradle 18 there is a resilient latch member 24 carrying a latch 26. A soft iron armature 28 carried by latch member 24 is spaced from a magnetic yoke 30 carried by bimetal 32. With the circuit breaker closed (as shown) a circuit may be traced through the circuit breaker from its load terminal 32 to stationary contact 34, via moving contact arm 16 and flexible conductive braid 36 to and through bimetal 32 and to line terminal 38 of the circuit breaker. In the event of a sustained mild overcurrent, bimetal 32 deflects to the right after an appreciable time delay so as to withdraw latch 26 and release cradle 18. When this occurs, spring 22 shifts overcenter, to the right of the pivot end of arm 16. Contact arm 16 is then biased in the contact-opening direction, automatically opening the contacts. In the event of a sudden severe overload, the current through bimetal 32 produces an instantaneous force attracting armature 28 toward magnetic yoke 30, once again causing the contact operating mechanism to open the contacts.

The circuit breaker thus far described is entirely conventional. The circuit breaker shown additionally includes a holding coil 40 having an armature 42 that moves freely within coil 40, and a compresion coil spring 44 that biases 42 to the right. A head 46 on core 42 has clearance from, but is cooperable with a hook 48 carried by flexible member 24 of the overcurrent release means. Head 46 does not interfere with the deflection of bimetal 32 toward the right, and accommodates movement of member 24 toward the right in the event of an overcurrent. Coil 40 is connected to line terminal 38 of the circuit breaker in the construction illustrated, while the opposite end of coil 40 is connected to terminal 51. Armature 42 and head 46 are shown in the energized condition of coil 40, with head 46 limited by stop 50 against further leftward movement.

The circuit breaker as described above, equipped with a holding coil, is included in the following circuit. Electrical supply conductors 52' and 54 extend to load 56. Circuit breaker 10 and its interrupting contacts 16 and 34 are interposed between line conductors 52 and 52'. A zero-phase-sequence transformer is provided, including a core 58 that encircles the conductors 52' and 54 extending to load 56. This transformer includes a secondary winding 60 that is connected to a relay 62. Relay contacts 62a connect line 54 to coil terminal 51 so long as relay 62 is not energized. In the event of a ground-fault appearing in the wiring to the right of zero-phase-sequence transformer 58, 60 or in load 56. relay 62 would be energized, contacts 62a would open and holding coil 40 would be de-energized so that interrupter contacts 16, 34 would open.

In the event that a defect should develop in the holding coil circuit, whether due to the coil itself being burned out, or because of a defect in the circuit connections to the coil, there would also be a failure of energizing current to the holding coil. Once again, the interrupter contacts would open automatically.

The foregoing construction is distinctively superior to any comparable ground-fault circuit-breaker tripping arrangement in which a coil is provided that is normally de-energized and in which tripping of the circuit breaker depends on energizing the tripping core in response to ground-fault conditions. In the latter case, if there were a defect in the tripping coil or in its circuit connections, then the system would be insensitive to the ground-fault tripping signal. Despite the existence of the ground-fault, the contacts would remain closed. Accordingly, an important improvement is represented by an automatic circuit breaker having a ground-fault releasing coil that must be kept energized to prevent opening of the contacts. In the event of any failure in the hold-coil circuit, the contacts would open automatically. The described protective apparatus thus adds importantly to the margin of safety of the system. Assurance is provided that the holding coil circuit is dependable and in the necessary operative condition at all times while the circuit breaker is closed.

Figure 2:
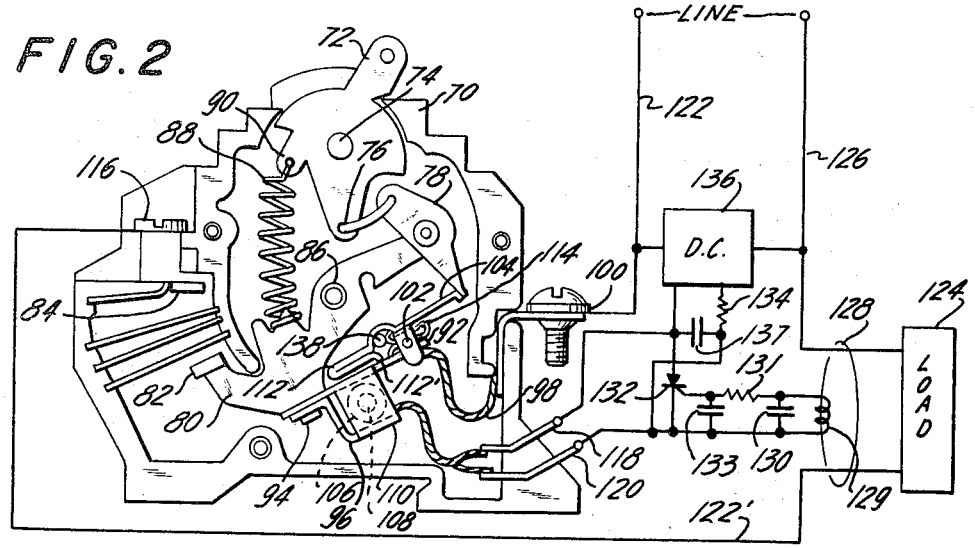
FIG. 2 is a modification of the embodiment in FIG. 1.

A modification of the apparatus in FIG. 1 is shown in FIG. 2, including certain additional features. In FIG. 2 a circuit breaker is shown of the type generally illustrated in U.S. Pat. No. 2,897,314 issued July 28, 1959 to T. M. Cole, modified for present purposes. A case 70 of molded insulation is shown in the front cover removed. The mechanism includes an operating handle or lever 72 having a stationary pivot 74 connected by a link 76 to a so-called bell crank 78. A contact arm 80 has an insulated pivot at its right-hand extremity, carrying bell crank 78, and at its left-hand extremity arm 80 carries a movable contact 82 for cooperation with stationary contact 84. A coil-spring pivot 86 resiliently supports contact arm 80 between its extremities. Compression coil spring 88 extends between a projection 90 of handle 72 and a part of arm 80 to the left of pivot spring 86.

An elongated current responsive bimetal 92 is united to contact arm 80 by a rivet 94 that extends integrally from the contact arm. A bracket 96 of non-magnetic metal is also united to contact arm 80 by rivet 94. Conductive braid 98 is welded to bimetal 92 near its right-hand extremity. This braid extends to external terminal 100. A pivot pin 102 is also fixed to bimetal 92, near the right-hand extremity of the bimetal. A latch 104 is carried on pivot 102 and is shown in position to arrest clockwise movement of bell crank 78. In this condition of latch 104 and bell crank 78, it is possible to close the circuit breaker by driving handle 72 counterclockwise. A latched unit is formed by bell crank 78, latch 104, bimetal 92 and contact arm 80, so that when handle 72 is operated counterclockwise, link 76 drives contact arm 80 clockwise about its pivot 86, to drive movable contact 82 against its companion contact 84.

Bracket 96 supports an electromagnet comprising a coil 106 on a core 108 that extends perpendicular to the view. Magnetic end plates or pole pieces 110 are secured to opposite ends of core 108, flanking bimetal 92. An armature 112 is disposed opposite to but spaced from the pole pieces. Stop 112' engages the bimetal when the coil is energized, holding latch 104 in proper position for controlling bell crank 78. So long as coil 106 is energized, armature 112 is attracted by the electromagnet, and latch 104 remains in the illustrated position. However, a spring 114 is interposed between bimetal 92 and the latch-and-armature unit 104, 112 for providing a clockwise bias tending to move latch 104 downward. Latch 104 does move downward when the electromagnet is not energized. When that happens, operation of handle 72 counterclockwise is not effective to operate contact arm 80 in the closing direction. This is because handle 72 can act via link 76 to drive bell crank 78 clockwise freely, latch 104 being deflected downward and out of the clockwise path of bell crank 78. This condition is prevented only so long as the electromagnet remains energized. Furthermore, assuming the electromagnet is energized and assuming that the circuit breaker has been closed, de-energization of the coil results in latch 104 being moved downward by spring 114. Bell crank 78 is thus freed, and push-off spring 88 drives the contact arm to its open position shown. Therefore it is clear that the circuit breaker cannot be closed, nor can the circuit breaker remain closed, unless coil 106 is continuously energized.

A circuit can be traced through the circuit breaker from terminal 116 through contacts 84 and 82, contact arm 80, bimetal 92, and braid 98 to terminal 100. Terminals 118 and 120 are provided for making connection to coil 106. A circuit can be traced from line 122 through the circuit breaker as described, and along line conductor 122' to load 124. The opposite load terminal is connected to line conductor 126. In the event of an overcurrent in this circuit (the circuit breaker being closed) bimetal 92 deflects downward carrying latch 104 downward and freeing bell crank 78, thereby resulting in automatic opening of the circuit breaker. In the event of a severe overcurrent, bimetal 92 acts as a heavy-current conductor that induces a strong magnetic field in the core structure 108, 110 that attracts armature 112 downward. This strong attraction deflects armature 112 and bimetal 92 and latch 104 downward, thereby providing instantaneous magnetic overload release for the circuit breaker.

A ground fault detector is provided in FIG. 2, as in FIG. 1, including a zero-phase-sequence transformer, or differential current transformer, having a core 128 encircling conductors 122′ and 126, and a winding 129. A resonating condenser 130 is connected across winding 129.

A ground-fault signal from winding 129 is coupled through resistor 131 to the gate of an SCR (silicon controlled rectifier) 132 whose anode-cathode circuit is connected in parallel with coil 106. Capacitor 133 across the gate-cathode terminals of the SCR acts, with resistor 131, to suppress spurious pulses that might otherwise fire the SCR. A resistor 134, which may be the internal impedance of DC supply 136, is interposed as series element between the parallel paths of coil 106 and the anode-cathode circuit of the SCR.

In case of excessive ground leakage current in the load 124 or in the lines extending to the load from zero-phase-sequence transformer 128, 129, SCR 132 fires so as to shunt most of the current that would otherwise flow through coil 106. The current flowing to the SCR through resistor 134 decreases the voltage available to coil 106, substantially de-energizing this holding coil. Consequently, spring 114 becomes effective to move latch 104 clockwise, releasing bell crank 78 and opening the circuit breaker.

A bypass capacitor 137 is connected across coil 106. This capacitor provides protection for the SCR in case a high voltage pulse is induced in coil 106, due to a current surge in bimetal 92.

FIG. 2 shows a circuit including the circuit breaker equipped with a holding coil that is energized at all times except when a ground-fault occurs. This construction enables the circuit breaker to provide ground fault interrupting contacts in addition to its function as an overload and short circuit protector. In common with the embodiment of FIG. 1, the embodiment of FIG. 2 has the fail-safe feature of providing assurance that the tripping coil and the energizing circuit for the tripping coil are intact and ready to operate whenever ground fault conditions should develop.

To the extent described above, the circuit breaker of FIG. 2 provides single-pole protection. However, FIG 2, also represents one pole of a multi-pole circuit breaker. The other such poles are of a construction identical to that shown except that those other poles would omit the holding coil in FIG. 2, and in those other poles spring 114 would be arranged to provide counterclockwise bias for latch member 104. Rod 138 that is made of insulation sulch as nylon extends across all the poles, and provides for common tripping. It will be appreciated that rod 138 maintains the illustrated relationship wtih respect to each of the poles of a multi-pole circuit breaker, both in the open circuit condition of that circuit breaker and in its closed condition. In case any one of the poles of such multi-pole circuit breaker were to trip open for any reason, the tripped pole would carry its portion of rod 138 counterclockwise about pivot 86. This motion drives the latch member 104, 112 of the companion poles in the tripping direction, releasing its companion poles for automatic opening. In the interest of conciseness those other poles are not separately illustrated and described. Common tripping arrangements for circuit breakers of the form shown may also be provided in the manner illustrated in U.S. Pat. Nos. 2,662,949 and 2,923,795.

The circuit breaker of FIG. 2 and the ground-fault responsive circuit that interrupts the energization of holding coil 106 respresents a feasible application of the invention. The inherent heat developed by coil 106 in operation would affect bimetal 92, but this may be taken into account in calibrating the bimetal. That effect may be avoided entirely by using a multipole circuit breaker as described above, omitting load connections to the pole illustrated in FIG. 2 and using a companion pole or poles for overload protection. Coil 106 is to be included in only one pole, to respond to the ground-fault detector circuit. No load connections should then be made (and none need be provided) for the mechanism equipped with holding coil 106. The load-current would be carried only by the companion circuit-breaker mechanism or mechanisms.

In the various forms of circuit breaker described above in connection with FIG. 2, the breaker cannot be closed initially, and it opens automatically, in case of a burned out ground-fault release coil or in case of faulty connections to that coil. An important measure of reliability has been added. So long as the circuit breaker remains closed, the tripping coil and its circuit are known to be intact. Such continuous self-proving demonstration of integrity of the ground-fault release circuit is of special importance where the ground-fault protection system is used for saving lives.

Conventional circuit breakers are of the so-called trip-free construction. This means that the mechanism is free to open automatically in response to an overcurrent even while the operating handle is being moved in the contact-closing direction. The two circuit breakers illustrated in FIGS. 1 and 2, and which are of conventional design apart from the holding coil feature, have this trip-free characteristic. Accordingly, if there a ground-fault condition in the load when the contacts close, each of those circuit breakers would open promptly and automatically even while the handle is being moved and then held in its "on" position. Once having tripped open in response to ground-fault, the apparatus does not reclose even momentarily, thus avoiding renewed supply of power in a faulty hazardous circuit.

In some areas of the country there may be momentary power interruptions from time to time and these may be frequent in some localities. Where the apparatus of FIGS. 1 and 2 is adopted in such localities, the ground-fault release coil would be de-energized and would release the circuit breaker just as if a ground fault had appeared. Such operation would constitute "nuisance tripping." An attendant would have to be available and alert to restore service. The following provision is made for automatically restoring service where the circuit breaker opens in response to de-energization of its holding coil but only where the de-energization is due to an interruption in power service and not where the interruption resulted from a ground fault condition.

Figure 3:
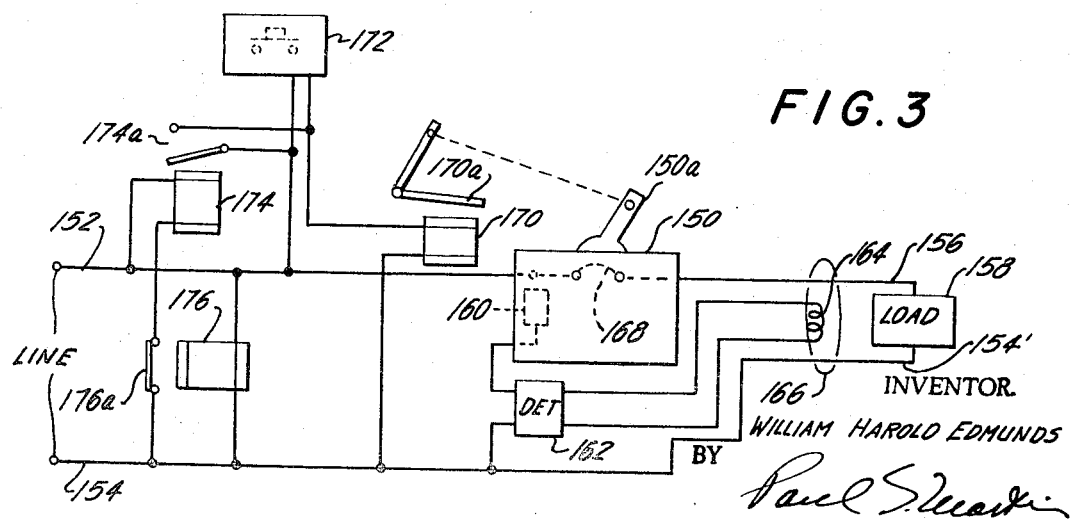
FIG. 3 is the wiring diagram of an electrical circuit having improved ground-fault protection means of the type in FIGS. 1 and 2 and including a normally energized holding coil, further including automatic reclosing means.

In FIG. 3 a circuit breaker 150 is shown connected between supply line 152 and line 156 connected to load 158. Lines 154 and 154′ provide a return circuit to the supply. Holding coil 160 in breaker 150 is shown diagrammatically as being connected directly to line 152 and, through detector 162 to line 154. The actual holding-coil circuit may be that in FIG. 1 or FIG. 2, or various others may be used. Detector 162 has an input signal connection to winding 164 on a closed-loop core 166 about lines 154′ and 156, to provide a ground fault signal. In case of a ground fault, circuit breaker 150 is tripped open automatically by de-energization of its holding coil 160. Contacts 168 would then open and the load would be de-energized.

In the event of interruption of energy at supply lines 152 and 154, the circuit breaker would also open automatically. The following means is provided for reclosing the circuit breaker under such conditions.

An electromagnet 170 is provided, having an armature 170a mechanically coupled to the operating handle 150a of circuit breaker 150. When electromagnet 170 is energized, handle 150a is moved to effect a closing operation of the circuit breaker. Electromagnet 170 is conveniently energized by means of a remote pushbutton 172. Additionally, contacts 174a of a relay 174 are provided, these contacts being closed when relay 174 is not energized. A pair of relay contacts 176a are connected in series with relay 174. Relay 176 is connected across supply lines 152, 154, and contacts 176a are closed so long as power is supplied to lines 152, 154.

It may be assumed that circuit breaker 150 is closed and that load 158 is energized. If there should be a momentary interruption of power, contacts 176a open, relay 174 is de-energized and contacts 174a close as soon as relay 174 is de-energized. Subsequently, when power is restored either immediately or after a time relay, relay 176 closes its contacts 176a. Relay 174 is once again energized; but it is equipped with suitable time delay means such as a dash-pot or a solid-state delay circuit to allow its contacts 174a to remain closed for a short time, long enough to insure operation of electromagnet 170 for reclosing circuit breaker 150. Relay contacts 176 are also equipped with time delay means so that, if they are released to move to their open condition, a dash pot or other time delay means delays their reclosing. This is an optional feature. Relay 176 allows a time period to elapse before reclosing operation, to insure return of coil 160 to its proper state for enabling the circuit breaker to be reclosed.

The circuit of FIG. 3 is effective in the form shown to reclose a circuit breaker whose operating handle or lever assumes the "off" position following automatic release of its contacts. The circuit breaker of FIG. 2 satisfies this requirement. The concept of FIG. 3 is applicable also to other forms of circuit breakers which require a "reset" motion of the operating handle or lever before the closing motion takes place. An example of such a circuit breaker appears in FIG. 1. There, after the cradle has been released and after the contacts open, the handle assumes a trip indicating position. Where the circuit breaker employed involves that kind of operation, the circuit-breaker-closing electromagnet illustrated in FIG. 3 would be replaced by a conventional motor operated recloser designed for such circuit breakers.

The foregoing illustrative embodiments of the invention in its various aspects are readily modified and may be adapted to various applications, by those skilled in the art. Consequently, the invention should be construed broadly in accordance with its full spirit and scope.

I claim:

1. A ground-leakage protector including line terminals, load terminals, means including load-break contacts for connecting said line terminals to said load terminals, operating means for closing and opening said contacts, and control means for causing automatic opening of said contacts, said control means including spring means providing bias for causing automatic opening of said contacts, an electromagnet effective when energized for defeating said spring means, and ground leakage detection means for monitoring the circuit connected to the load terminals and operative to reduce the energization of said electromagnet in response to a ground fault, thereby freeing said spring means to cause opening of the contacts, said spring means also being effective automatically for opening the contacts in case of a discontinuity in the electromagnet or its energizing circuit.

2. A ground leakage protector in accordance with claim 1, wherein said operating means for said contacts is a trip-free mechanism.

3. A ground-leakage protector in accordance with claim 1, wherein said means for causing automatic opening of said contacts includes means responsive to an over-current in the circuit through the contacts to cause opening of the contacts.

4. A ground-leakage protector in accordance with claim 2, wherein said means for causing automatic opening of said contacts includes means responsive to an over-current in the circuit through the contacts to cause opening of the contacts.

5. A ground-leakage protector in accordance with claim 1, wherein said electromagnet causes opening of said contacts in response to interruption of energization of said line terminals, further including means operable automatically in response to power interruption at said line terminals to actuate said operating means to reclose the contacts.

References Cited
UNITED STATES PATENTS

| | | | |
|---|---|---|---|
| 2,854,546 | 9/1958 | Cole | 335—35 |
| 3,440,579 | 4/1969 | Smith | 335—18 |
| 3,440,580 | 4/1969 | Molenaar | 335—18 |

JAMES D. TRAMMELL, Primary Examiner

U.S. Cl. X.R.

317—58, 157; 335—18, 35